(12) United States Patent
Meyder et al.

(10) Patent No.: US 7,958,783 B2
(45) Date of Patent: Jun. 14, 2011

(54) METHOD AND DEVICE FOR ANALYZING THE EFFECTS OF THE VIBRATIONS OF A VEHICLE TRANSMITTED TO A PERSON

(75) Inventors: Volkhart Meyder, Odenwald (DE); Ing Steffen Pankoke, Erlenbach (DE); Dieter Müller, Würzburg (DE)

(73) Assignee: Grammer AG, Amberg (DE)

( * ) Notice: Subject to any disclaimer, the term of this patent is extended or adjusted under 35 U.S.C. 154(b) by 491 days.

(21) Appl. No.: 12/020,392

(22) Filed: Jan. 25, 2008

(65) Prior Publication Data

US 2008/0258522 A1 Oct. 23, 2008

(30) Foreign Application Priority Data

Apr. 23, 2007 (DE) .................. 10 2007 019 366

(51) Int. Cl.
*G01N 29/07* (2006.01)
(52) U.S. Cl. ................ 73/579; 73/593; 73/597; 73/602
(58) Field of Classification Search .................. 73/579, 73/587, 593, 660, 661, 602; 267/120
See application file for complete search history.

(56) References Cited

U.S. PATENT DOCUMENTS

| | | | |
|---|---|---|---|
| 5,226,500 A * | 7/1993 | Doi et al. ................... | 180/312 |
| 5,536,059 A | 7/1996 | Amirouche | |
| 5,610,686 A * | 3/1997 | Osanai ....................... | 355/72 |
| 5,617,315 A * | 4/1997 | Nakao et al. ............... | 701/36 |
| 5,627,440 A | 5/1997 | Yamamoto et al. | |
| 5,690,321 A * | 11/1997 | Seni et al. ................. | 267/140.14 |
| 6,078,791 A | 6/2000 | Tuttle et al. | |
| 6,490,930 B1 | 12/2002 | Ohkubo et al. | |
| 7,487,679 B2 * | 2/2009 | Sirrine et al. .............. | 73/660 |
| 7,578,193 B2 * | 8/2009 | Davidson .................. | 73/661 |
| 2006/0185434 A1 | 8/2006 | Bernhagen | |
| 2007/0236071 A1 | 10/2007 | Fujita et al. | |
| 2008/0156602 A1 | 7/2008 | Hiemenz et al. | |
| 2008/0262785 A1 | 10/2008 | Meyder et al. | |

FOREIGN PATENT DOCUMENTS

| | | |
|---|---|---|
| DE | 452315 | 11/1927 |
| DE | 1019848821 | 5/2000 |
| DE | 102004061574 | 7/2006 |
| DE | 102005043575 | 3/2007 |
| DE | 102005044214 | 3/2007 |
| EP | 1050749 | 11/2000 |
| EP | 1693655 | 8/2006 |
| JP | 2004058695 | 2/2004 |
| JP | 2004185476 | 7/2004 |
| JP | 2005140668 | 6/2005 |
| WO | 0043952 | 7/2000 |
| WO | 2004057528 | 7/2004 |
| WO | 2005008578 | 1/2005 |
| WO | 2005022690 | 3/2005 |

\* cited by examiner

*Primary Examiner* — Jacques M Saint Surin
(74) *Attorney, Agent, or Firm* — Black Lowe & Graham, PLLC

(57) ABSTRACT

Device and method for recording vibrations transmitted from a vehicle to a person. The person is using a cushioned and preferably sprung vehicle seat of a vehicle by way of at least one detector unit for detecting vibration values, whereby the detector unit is arranged on the vehicle seat frame or an associated component and an analysis unit for analyzing the vibration values detected calculates vibration results for the vibration acting on the person using a preset transmission function.

16 Claims, 5 Drawing Sheets

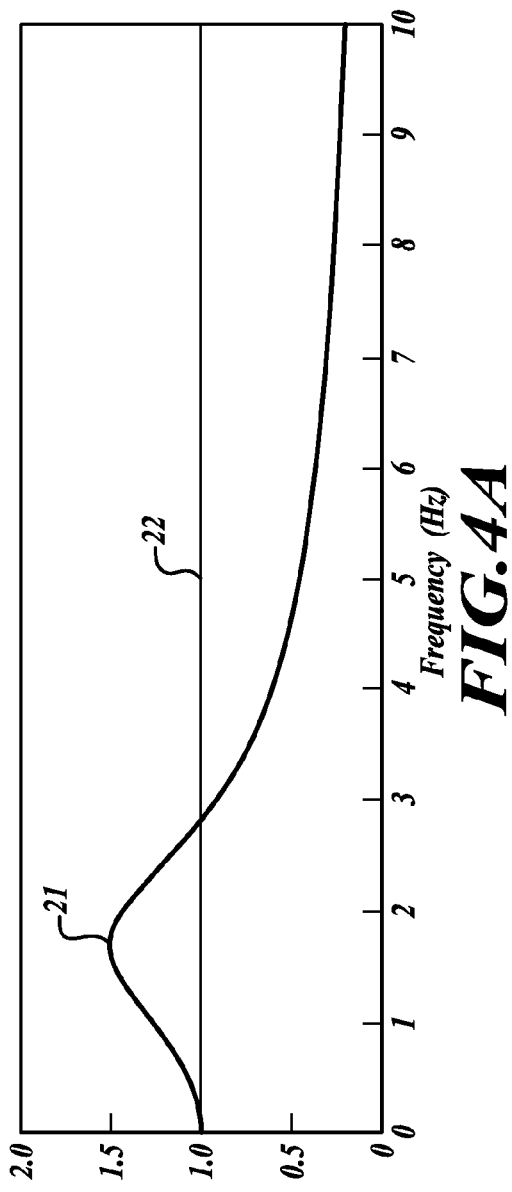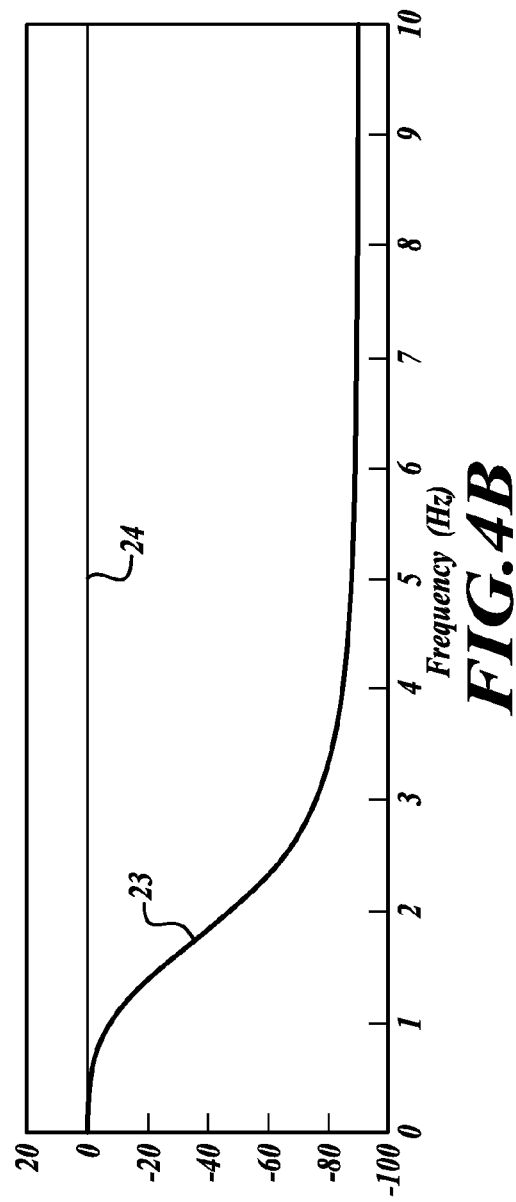

METHOD AND DEVICE FOR ANALYZING THE EFFECTS OF THE VIBRATIONS OF A VEHICLE TRANSMITTED TO A PERSON

PRIORITY CLAIM

This application claims priority to German Application No. 102007019366.3 filed Apr. 23, 2007, which application is hereby incorporated by reference in its entirety as if fully set forth herein.

BACKGROUND OF THE INVENTION

There is a method known for analysing the effects of a vehicle seat fluctuating on a person, whereby the person is using a vehicle seat in the vehicle, for example from DE 10 2004 061 574 A1. Such devices are arranged as a flat casing on a seating area on which the person using the seat sits. They are therefore worked into a seat cushion and connected permanently to it, such that retrofitting vehicle seats with such vibration recording devices can only be done by replacing the entire seat cushion. Such devices worked into the seat cushion also upset the driver's comfort, as they impede the cushioning effect and hence the attenuating effect of the cushion element of the vehicle seat.

SUMMARY

The present invention provides a device for recording the vibrations of a vehicle seat transmitted to a person and a method which makes it possible to retrofit vehicle seats with such a device quickly and easily and record the vibrations acting on the person without affecting the seating comfort of a vehicle seat that person is using.

One of the main points of the invention is that, with a device for recording vibrations acting on a person, such as unwanted vibrations and shocks, whereby the person is using a cushioned and preferably sprung vehicle seat of a vehicle, at least one detector unit is fitted to detect vibration values of that detector unit on the vehicle seat frame or a component connected to it and an analysis unit for analysing the vibration results values detected acting on the person via a preset transmission function for converting measured vibration values to acceleration values. Using such a transmission function to calculate the vibrations effectively acting on the person means that the device, which can be arranged inside a small casing, can be attached to the vehicle seat frame using a quick-release magnetic, adhesive or mechanical connection, such that any vehicle seat can be retrofitted to measure such vibrations quickly and easily.

A device, which can be arranged within a casing, and which can therefore be used as a so-called vibration dosimeter, is fitted with a separate energy supply unit, such as a battery, so that it can be operated wirelessly and independently of any on-board electricity supply sources. Once the battery used has lost all its charge, such as after eight to twelve hours, for example, the maximum driving time for operating a commercial vehicle, such as a truck, for an individual driver will have elapsed in any case, such that the unit can be removed from the seat—including for analysis purposes—and attached to a PC or the like by way of interfaces provided for that purpose. It can then be analyzed with the aid of the PC and Excel tables provided for the purpose, say.

The interfaces can be provided as USB ports with appropriate converter devices and, alternatively or in addition, interfaces for plugging into on-board power sockets. Such batteries can also take the form of two AAA NiMH batteries of approx. 1000 mAh or AAA batteries, for example.

The data to be read out can be digitalized before being read out, making it simpler to transfer it to other units, such as a PC. Root mean square (RMS) values can also be calculated and measured data standardized on interface digitally on a processor using firmware.

Under the EU's Human Vibration Directive 2002/44/EC, all employers are responsible for analyzing the effects of vehicle vibrations acting on their employees when using those vehicles as drivers. With agricultural and construction machinery in particular, therefore, the vibrations during the day acting on a person directly must be measured. Subsequent analysis will then show whether they exceed the maximum vibration limit imposed by the EU directive by aggregating the individual vibrations. A vehicle seat must therefore be equipped with such a removable vibration dosimeter so that those vehicles which do not have newly made vehicle seats which may already have such vibration dosimeters built in can have such vibration dosimeters fitted to them.

The transmission function is provided by way of a filter which uses filter values which are based on difference values between the behavior of measured vibration values on a cushioned surface of the cushioned vehicle seat to measured vibration values on the vehicle floor in contact with the vehicle seat and the relationship of the vibration values detected to the vibration values measured on the vehicle floor. A preceding model trial is therefore used to determine the transmission function of a number of vibration values on the cushioned surface, on the vehicle seat frame to which the vibration dosimeter can be attached and on the vehicle floor to give the relationships above. Forming these relationships can therefore be used as the basis for a universally useable transmission function for using on all common vehicle seats such that a vibration dosimeter so equipped or a device for recording the vibrations of a vehicle can also be mounted on the vehicle seat frame or vehicle seat base, for example, if the vibrations which exist in the vicinity of the seat surface in each case are not known.

In a preferred embodiment, the transmission function is deactivated at frequencies of the detected vibration values over 20 Hz, such that, while such frequencies are included when evaluating vibrations over the day, they are ignored when considering a threshold value.

Such a device for recording vibration can advantageously run an automatic position correction using a built-in tilt detector unit. For this, individual sensors measure static measured values in three directions in all, and can hence determine the precise x-, y- and z directions. This makes it unnecessary to ensure that the unit is aligned in accordance with the x-, y- and z-axes: instead, the user can attach the unit or vibration dosimeter or device individually without orienting it specifically to the vehicle seat frame using a magnetic connection, for example.

The device preferentially has a memory for saving the vibration values saved and/or vibration results. Such a memory can then be read out via the interfaces mentioned above by means of the PC connected to them, enabling the measurements to be analyzed on the PC. This makes it possible to analyze the measurements in terms of the daily dosage of vibration acting on the person over the whole day and determine whether this exceeds preset thresholds. It can also analyze when and for how long particularly strong vibrations act on the person and whether the vehicle's underlying springing is still intact.

In a preferred embodiment, the detector unit has at least one acceleration sensor measuring in three axes at right angles to one another, which is designed to measure accelerations of up to 20*9.81 m/s², preferably up to 16*9.81 m/s² in each axis. This detects the acceleration caused by the vibrations and passes them on, as analog or digital signals, for example, to a memory unit or directly to an analysis unit.

The device may advantageously be equipped with display elements to display a total of the vibration results calculated per day and the foreseeable total per day as a function of the vibration results calculated so far that day and/or a charging condition of an energy supply unit. To calculate the total of the vibration results calculated per day, they are already analyzed within the device. In addition, the foreseeable total per day as a function of the vibration results calculated so far that day can be displayed via the display to implement a trend analysis so that the driver or person can find out whether, if they continue driving as they are at present, at current vibration frequencies, they will have to stop driving prematurely, as otherwise they would exceed the preset limit for the maximum permitted daily dose of vibration. Such a trend analysis display could also be used to reduce the effects of vibration by choosing another route or taking a break so that the limit is not exceeded.

The detector unit at least is arranged in a casing fitted to the vehicle seat or a component connected to it, which is preferably of plastic and which is conveniently flat and small in design.

A method for recording vibrations of a vehicle transmitted to a person advantageously calculates the vibrations detected by the detector unit which are measured on the vehicle seat frame as the substitute measurement point as vibrations acting directly on the person in the vicinity of the surface of the seat surface of the vehicle, such that it is not necessary to arrange the device of the invention immediately below the surface of the seat or on the surface of the seat of the vehicle seat.

Other advantageous embodiments will be apparent from the sub-claims.

BRIEF DESCRIPTION OF THE DRAWINGS

The advantages and suitabilities can be taken from the specification below in connection with the drawings, which show as follows:

FIGS. 4a and 4b are correction filter data for implementing a transmission function as in an embodiment of the invention.

DETAILED DESCRIPTION

Figure 1:
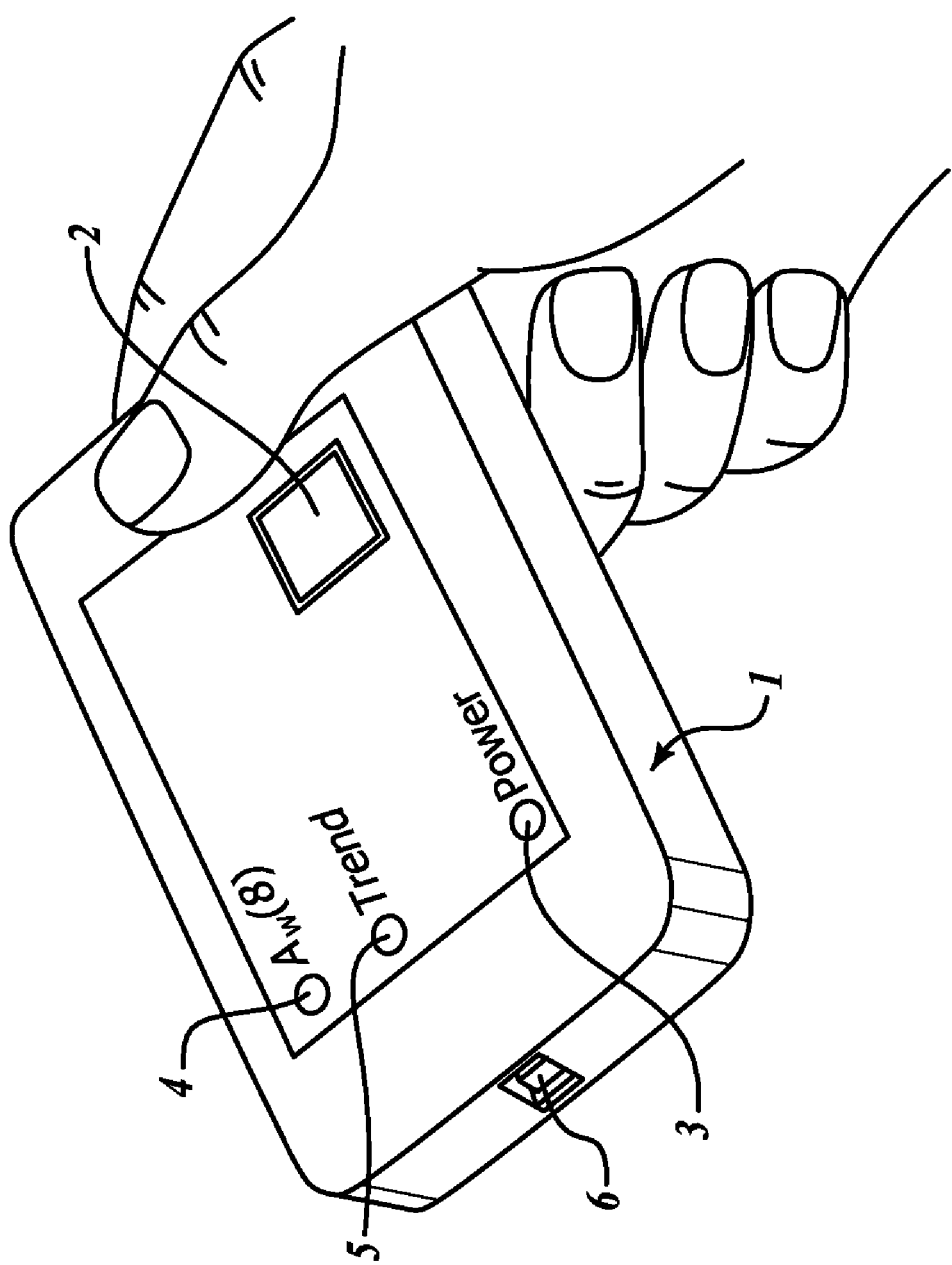
FIG. 1 is a perspective drawing of a device for recording vibrations of a vehicle transmitted to a person as in an embodiment of the invention.

FIG. 1 is a perspective presentation showing a device for recording vibration transmitted from a vehicle to a person as in an embodiment of the invention. The device has a casing 1 containing a start and stop button 2. There is also a display 3 which shows the current charge level of a battery integrated in casing 1, which is rechargeable.

Another display 4 indicates whether the permitted daily dose of vibration has already been achieved.

Another display 5 shows a trend indicator which shows, when it lights up, that the maximum permitted limit for a daily dose of vibration can be expected to be reached prematurely if the vehicle continues to be operated or driven at its current vibration pattern.

Figure 2:
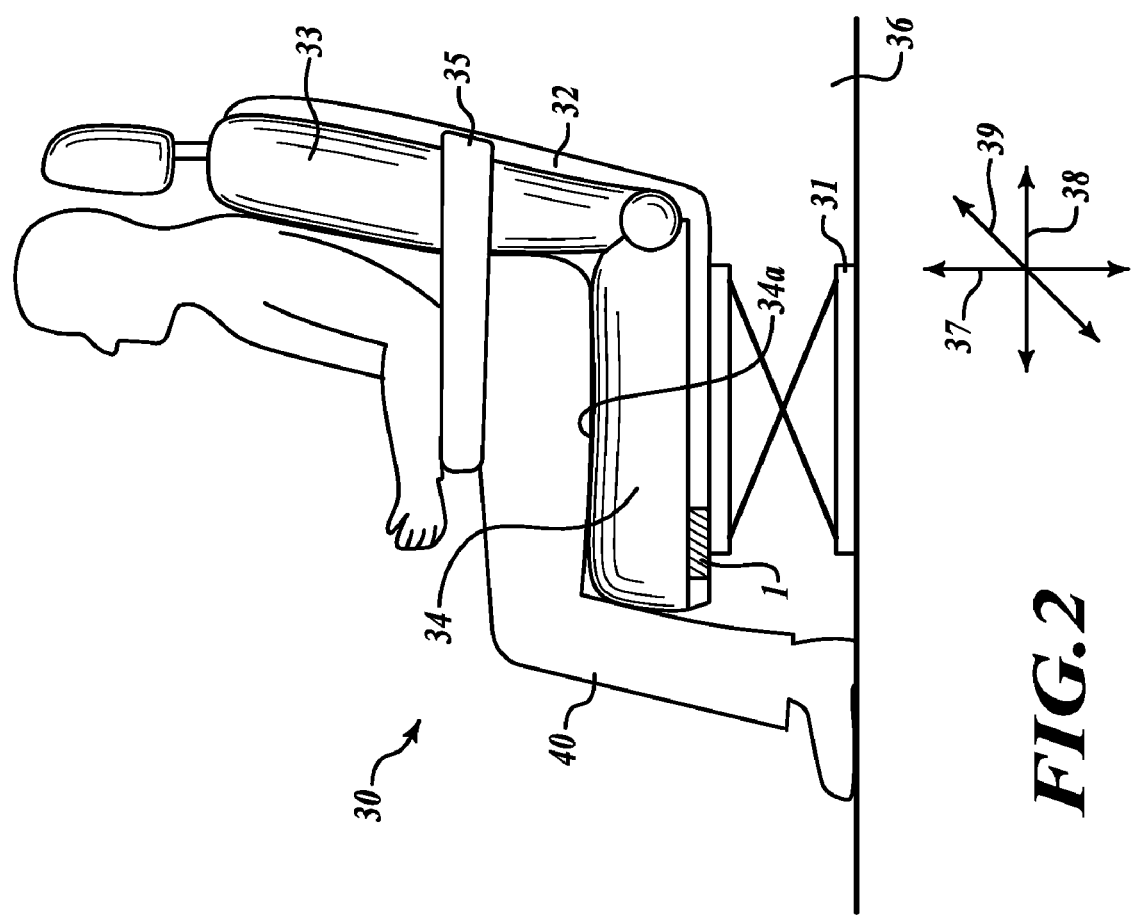
FIG. 2 is a diagrammatic perspective side view of a vehicle seat with a device of the invention arranged thereon.

FIG. 2 is a side view of a vehicle seat 30 with the device of the invention and vibration dosimeter 10 as in the invention. The vibration dosimeter 10 is attached by its casing 1 to the side of a vehicle seat frame 32 which is arranged above sprung foot 31 via a quick-release lock. The vehicle seat 30 also has a cushioned seat back 33 and seat cushion 34 with a surface 34a. An armrest 35 is also fitted.

Reference 36 indicates the vehicle with its associated floor area on which the vehicle seat 30 is arranged.

The vibration dosimeter measures the vibration detected in the vehicle seat frame 32, in the x-axis as reference 39, in the y-axis as reference 38 and in the z-axis as reference 37. The person 40 sits on the surface 34a of the seat cushion 34.

Figure 3A:
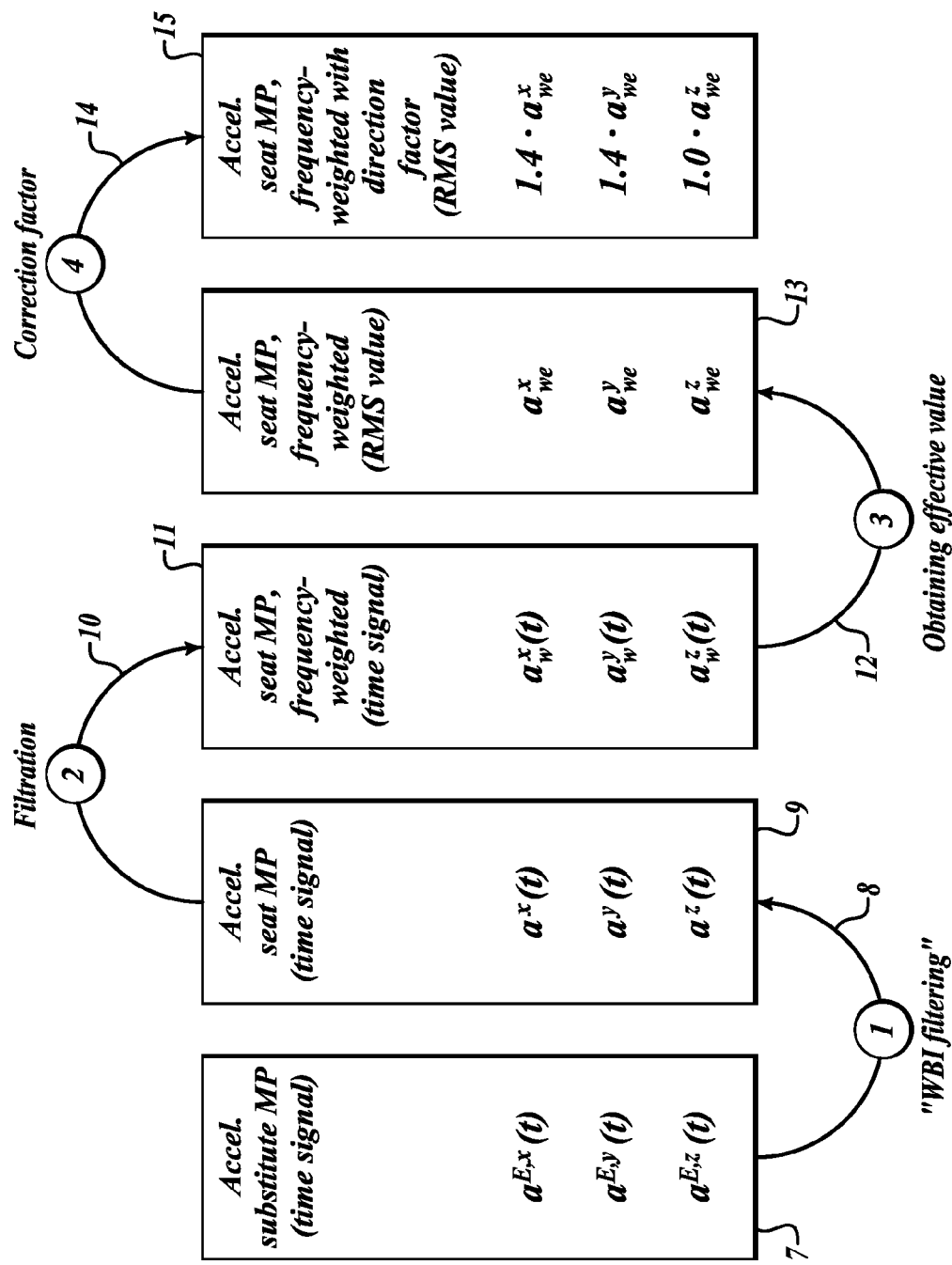
FIG. 3a is a first section of a method shown in diagrammatic form for determining daily exposure to vibration to which a driver is exposed.

FIG. 3a is a flowchart showing a method for determining daily exposure (See block 7) by measuring the accelerations at the substitute measurement point, i.e. on the vehicle seat frame, using an acceleration sensor present in a detector unit as a function of time and presenting them as measured results. These measured vibration values are converted to acceleration values in the x-, y- and z-axis (See block 9) using a transmission function 8. The results of block 9 are then converted by frequency (ISO 2631) as in references 10 and block 11.

Figure 3B:
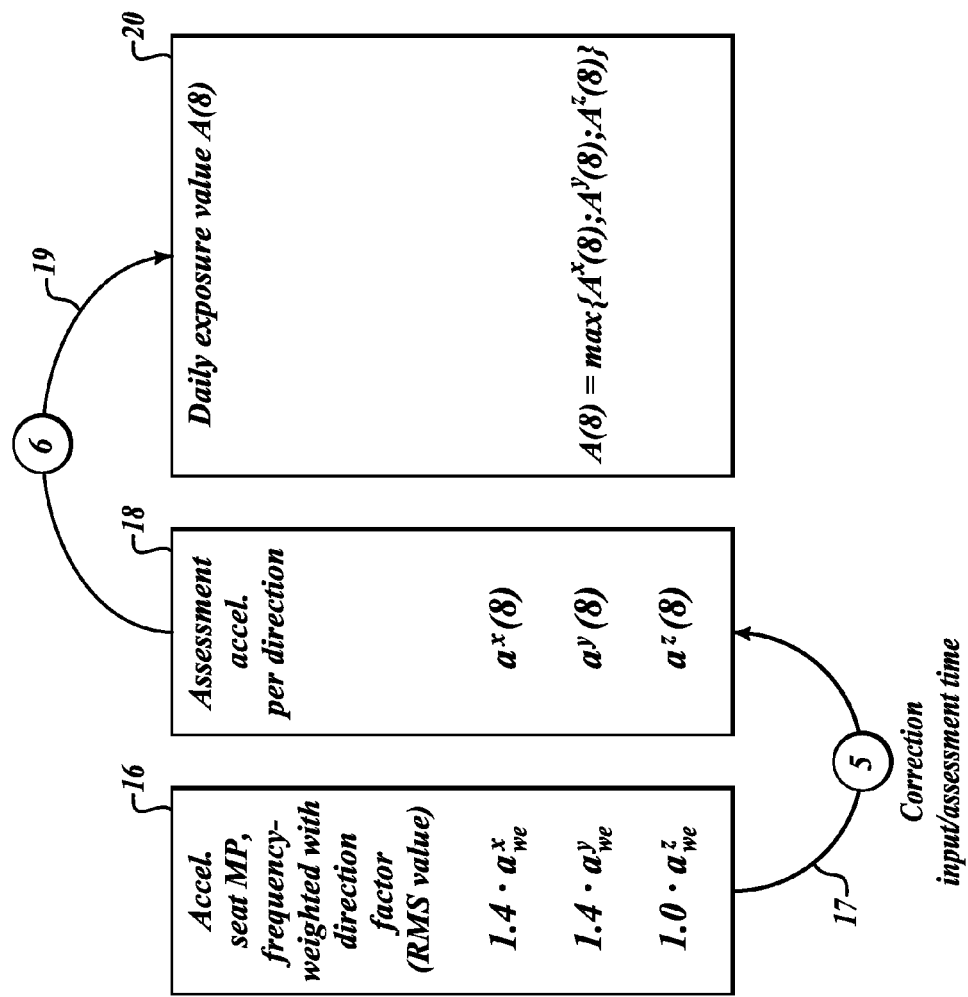
FIG. 3b is a second section of a method shown in diagrammatic form for determining daily exposure to vibration to which a driver is exposed.

At block 13 an effective value is obtained using a function 12. This obtains the frequency-valued effective value. A directional factor (reference 14) is applied to obtain directional factor-based frequency-valued vibration values, See block 15. This makes it possible to divide the various vibrations into their intensity measured over a whole day into the different axes, namely the x-, y- and z-axes. These values are shown in block 16 in FIG. 3b. A correction for the influence and valuation time is made (17), giving corrected values, See block 18. An analysis (reference 19) then gives the daily exposure values in the x-, y- and z-axes, See block 20.

Referring to FIGS. 4a and 4b, the filter data is calculated for setting up the transmission function and describes how it is derived. In the first step, the vehicle seat is put on a shaking device with artificially induced vibrations. The vehicle seat is then subjected to a load. In the third step, the vehicle seat is shaken extremely intensively, to record vibrations at three measurement points, namely one on the cushion surface, one on the vehicle frame to which the vibration dosimeter is to be attached and on the floor area of a commercial vehicle cab.

Then the relationships of the vibration values are determined, once from the measured vibration values on the cushion surface to the floor vibration values and once from the measured vibration values on the vehicle seat frame to the floor measured values.

To establish a filter, an analytical substitute model as a function of the x-, y- and z-axes is found which gives quantitative and phase curves as a function of frequency as in reference 21 and 23 in relation to the x-axis and as in references 22 and 24 in relation to the y- and z-axes.

The curves are transformed with their measured values into digital filter data. The filter data to use the transmission function is now available in digital form, and can be used in the analysis unit as in the invention.

All the characteristics disclosed in the application documents are claimed as essential to the invention insofar as they are new compared with the state of the art, individually or in combination.

KEY TO DIAGRAMS

1 Casing
2 Start and stop button
3, 4, 5 Display
6 Connectors
7 Vibration values
8 Transmission functions
9 Vibration results
10 Filtering
11 Frequency valued time signal
12 Effective value formation
13 Effective values
14 Correction factor formation
15, 16 Vibration valuation
18 Correction values
19 Calculation
20 Daily exposure values
21, 22, 23, 24 Filter values
30 Vehicle seat
31 Sprung foot
32 Vehicle seat frame
33 Cushioned seat back
34 Seat cushion
34a Surface
35 Armrest
36 Vehicle
37 z-axis
38 y-axis
39 z-axis
40 Person The embodiments of the invention in which an exclusive property or privilege is claimed are defined as follows:

1. A device for recording vibrations transmitted from a vehicle to a person, the device comprising:
    a cushioned and sprung vehicle seat mounted in the vehicle;
    at least one detector unit for detecting vibration values, the detector unit being arranged on one of a vehicle seat frame or an associated component;
    an analysis unit for analyzing the detected vibration values and calculating vibration results for the vibration acting on a person using a preset transmission function based on the analysis; and
    at least one filter for filtering the vibration values based on filter values, which are based on differences between a first relationship of measured vibration values at a cushion surface of the cushioned vehicle seat to measured vibration values at a floor of the vehicle, which is in contact with the vehicle seat, and a second relationship of the vibration values detected to the vibration values measured at the vehicle floor.

2. The device of claim 1, wherein the transmission function is deactivated at frequencies of vibration values detected in excess of 20 Hz.

3. The device of claim 1, further comprising a memory for saving one of the vibration values detected or the vibration results.

4. The device of claim 3, further comprising connectors connected to the memory and to a computer for reading out vibration value data saved.

5. The device of claim 1, wherein the detector unit includes one or more acceleration sensors for measuring in three planes at right angles to one another.

6. The device of claim 5, wherein the one or more acceleration sensors are capable of measuring accelerations of up to $20*9.81$ m/s$^2$.

7. The device of claim 1, wherein the calculated vibration results include at least one of a total of the estimated vibration results per day, foreseeable total per day as a function of the sum of the vibration results estimated so far that day or a charge level of an energy supply unit, the device further comprising one or more display elements for displaying the total of the estimated vibration results per day, the foreseeable total per day as a function of the sum of the vibration results estimated so far that day and the charge level of an energy supply unit.

8. The device of claim 1, wherein the detector unit is arranged in a casing fitted to one of the vehicle seat frame or a component connected to the vehicle frame.

9. The device of claim 8, further comprising an energy supply unit arranged in the casing to supply the detector unit and analysis unit with energy.

10. The device of claim 9, wherein the connectors are arranged in the casing are suitable for connecting the device to a charging unit for charging the energy supply unit electrically.

11. A method for recording vibrations of a vehicle transmitted to a person, whereby the person is using a cushioned, sprung vehicle seat in the vehicle, the method comprising:
    detecting vibration values of the vehicle seat;
    analyzing the detected vibration values based on a predetermined transmission function;
    calculating vibration results for the vibrations acting on the person in the area of the surface of seat cushion element of the vehicle seat based on the analysis; and
    filtering the vibration values based on filter values, which are based on differences between the relationship of measured vibration values at a cushion surface of the cushioned vehicle seat to measured vibration values at a floor of the vehicle in contact with the vehicle seat and the relationship of the vibration values detected to the vibration values measured at the vehicle floor.

12. The method of claim 11, wherein the transmission function is deactivated at frequencies of vibration values detected in excess of 20 Hz.

13. The method of claim 11, further comprising saving one of the vibration values detected or the vibration results in a local memory.

14. The method of claim 11, further comprising measuring accelerations of up to $20*9.81$ m/s$^2$.

15. The method of claim 11, wherein the calculated vibration results include at least one of a total of the estimated vibration results per day, foreseeable total per day as a function of the sum of the vibration results estimated so far that day or a charge level of an energy supply unit, further comprising displaying the total of the estimated vibration results per day, the foreseeable total per day as a function of the sum of the vibration results estimated so far that day and the charge level of an energy supply unit.

16. A device for recording vibrations transmitted from a vehicle to a person, the device comprising:
    a cushioned and sprung vehicle seat mounted in the vehicle;
    at least one detector unit for detecting vibration values at a surface of the cushioned vehicle seat, a floor of the vehicle and on a frame of the vehicle seat, wherein the detector unit comprises a plurality of acceleration sensors for measuring motion in three planes at right angles to one another;
    at least one filter for filtering the vibration values based on differences between a first relationship of measured vibration values at the surface of the cushioned vehicle seat to measured vibration values at the floor of the vehicle, which is in contact with the vehicle seat, and a second relationship of the vibration values of the frame of the vehicle seat to measured vibration values at the floor of the vehicle;

an analysis unit for analyzing the detected vibration values and calculating vibration results for the vibration acting on a person using a preset transmission function based on the analysis, wherein the calculated vibration results comprises at least one of a total of the estimated vibration results per day, foreseeable total per day as a function of the sum of the vibration results estimated during that day or a charge level of an energy supply unit;

a memory for saving one of the vibration values detected or the vibration results;

one or more display elements for displaying the total of the estimated vibration results per day, the foreseeable total per day as a function of the sum of the vibration results estimated during that day and the charge level of an energy supply unit, wherein the detector unit is arranged in a casing fitted to one of the vehicle seat frame or a component connected to the vehicle frame.

* * * * *